US012698429B2

(12) United States Patent

Luo et al.

(10) Patent No.: US 12,698,429 B2
(45) Date of Patent: Aug. 4, 2026

(54) MOISTURE-CURABLE POLYURETHANE HOT MELT ADHESIVE COMPOSITION WITH OLEIC CHEMICAL RESISTANCE

(71) Applicant: Henkel AG & Co. KGaA, Duesseldorf (DE)

(72) Inventors: Yizhong Luo, Shanghai (CN); Junjun Wu, Shanghai (CN)

(73) Assignee: Henkel AG & Co. KGaA, Duesseldorf (DE)

(*) Notice: Subject to any disclaimer, the term of this patent is extended or adjusted under 35 U.S.C. 154(b) by 819 days.

(21) Appl. No.: 17/933,576

(22) Filed: Sep. 20, 2022

(65) Prior Publication Data

US 2023/0025328 A1 Jan. 26, 2023

Related U.S. Application Data

(63) Continuation of application No. PCT/CN2020/082883, filed on Apr. 2, 2020.

(51) Int. Cl.

*C09J 175/06* (2006.01)
*C08G 18/42* (2006.01)
*C08G 18/79* (2006.01)

(52) U.S. Cl.

CPC ......... *C09J 175/06* (2013.01); *C08G 18/4211* (2013.01); *C08G 18/4213* (2013.01);

(Continued)

(58) Field of Classification Search

CPC ............... C09J 175/05; B32B 2255/06; C08G 18/4211; C08G 18/4213; C08G 18/4216; C08G 18/798; C08G 2170/20

(Continued)

(56) References Cited

U.S. PATENT DOCUMENTS 7,914,895 B2 3/2011 Reid
2010/0324254 A1* 12/2010 Saiki .................. C08G 18/4845 528/66

(Continued)

FOREIGN PATENT DOCUMENTS

CN 101679581 A 3/2010
CN 105925230 A 9/2016

(Continued)

OTHER PUBLICATIONS

International Search Report for International PCT Patent Application No. PCT/CN2020/082883 dated Jan. 7, 2021.

*Primary Examiner* — Ruiyun Zhang
(74) *Attorney, Agent, or Firm* — Sun Hee Thomas

(57) ABSTRACT

A moisture-curable polyurethane hot melt adhesive composition having good oleic acid resistance, especially when exposed to 100% pure oleic acid under aging condition of 65° C. and 90% relative humidity, wherein the adhesive composition comprises, consists essentially of or consists of a moisture-curable polyurethane prepolymer, the prepolymer being a reaction product of at least one amorphous polyester polyol containing an aromatic group and at least one polyisocyanate, preferably at least one polyisocyanate containing an aromatic group, wherein the aromatic group is comprised in the polyurethane prepolymer in a content of no less than 23 wt. %, preferably no less than 25 wt. %, more preferably no less than 30 wt. %.

20 Claims, 1 Drawing Sheet

(52) U.S. Cl.
CPC ....... *C08G 18/4216* (2013.01); *C08G 18/798* (2013.01); *B32B 2255/06* (2013.01); *C08G 2170/20* (2013.01)

(58) Field of Classification Search
USPC .................................................... 525/440.01
See application file for complete search history.

(56) References Cited

U.S. PATENT DOCUMENTS

| | | | |
|---|---|---|---|
| 2016/0251552 | A1 | 9/2016 | Das et al. |
| 2022/0340796 | A1 | 10/2022 | Komatsuzaki |

FOREIGN PATENT DOCUMENTS

| | | | |
|---|---|---|---|
| JP | 2006273986 | A | 10/2006 |
| JP | 2008255187 | A | 10/2008 |
| JP | 2013043914 | A | 3/2013 |
| WO | 03060033 | A1 | 7/2003 |
| WO | 2021054129 | A1 | 3/2021 |

* cited by examiner

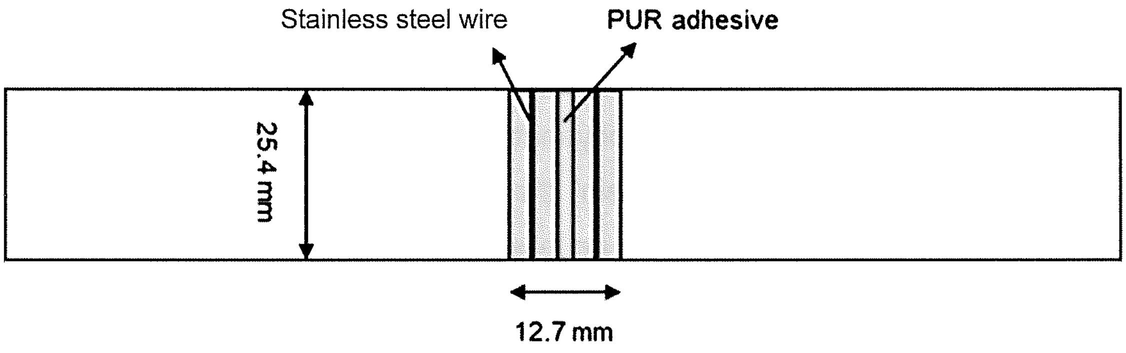
Stainless steel wire
PUR adhesive
25.4 mm
12.7 mm

MOISTURE-CURABLE POLYURETHANE HOT MELT ADHESIVE COMPOSITION WITH OLEIC CHEMICAL RESISTANCE

TECHNICAL FIELD

The present invention relates to moisture-curable polyurethane hot melt adhesive compositions with oleic chemical resistance.

BACKGROUND OF THE INVENTION

Adhesive compositions are widely used in many applications, and in some applications, the adhesive compositions may come into contact with oil or oil-containing compositions. The presence of oil may cause the decrease of adhesive bonding strength or even the failure of bonding strength.

Wearable or handheld electronic devices are composed of components bonded together with adhesive compositions. When the devices contact with the body, the skin may have natural oils or may include added oils such as emollient lotions or oils, sunscreen lotions or oils, suntan lotions or oils. If oil transfers from the user to the electronic devices and contacts the adhesive, the adhesive bond may decrease or fail either cohesively or adhesively.

It would be desirable to provide an adhesive composition that maintains bonding strength when exposed to oil(s) or oil-containing composition(s), for example, exposed to oil(s) or oil-containing composition(s) present on the skin of an individual.

SUMMARY OF THE INVENTION

The present invention provides a moisture-curable polyurethane hot melt adhesive composition having good oleic acid resistance, even when exposed to 100% pure oleic acid under aging condition of 65° C. and 90% relative humidity. Meanwhile, the adhesive composition of the present invention has a long open time.

The moisture-curable polyurethane hot melt adhesive composition of the present invention comprises, consists essentially of or consists of a moisture-curable polyurethane prepolymer, the polyurethane prepolymer being a reaction product of at least one amorphous polyester polyol containing an aromatic group and at least one polyisocyanate, preferably at least one polyisocyanate containing an aromatic group, wherein the aromatic group is comprised in the polyurethane prepolymer in a content of no less than 23 wt. %, preferably no less than 25 wt. %, more preferably no less than 30 wt. %.

In still another aspect, the present invention provides an article comprising: a first substrate, a cured adhesive, and a second substrate bonded to the first substrate through the cured adhesive, the cured adhesive comprising a cured product derived from the moisture-curable polyurethane hot melt adhesive composition of the present invention.

In still another aspect, the present invention provides a method of bonding together two substrates, the method including applying the moisture-curable polyurethane hot melt adhesive composition of the present invention to at least one of the substrates and then laminating together the substrates.

BRIEF INTRODUCTION OF THE FIGURES

FIG. 1 is a schematic view of the test sample for lap shear strength test.

DETAILED DESCRIPTION OF THE INVENTION

It is to be understood by one of ordinary skill in the art that the present discussion is a description of exemplary embodiments only and is not intended as limiting the broader aspects of the present invention. Each aspect so described may be combined with any other aspect(s) unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, all wt. % or % by weight values quoted herein are percentages by weight.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

The term "consisting essentially of" as used herein means that the listed components constitute main body of the composition, for example, at least 70% by weight of the composition, at least 80% by weight of the composition, at least 85% by weight of the composition, or at least 90% by weight of the composition.

The term "consisting of" as used herein is close-ended and exclude additional, non-recited members, elements or process steps.

The term "at least one" or "one or more" used herein to define a component refers to the type of the component, and not to the absolute number of molecules. For example, "one or more polyols" means one type of polyol or a mixture of a plurality of different polyols.

The terms "about", "around" and the like used herein in connection with a numerical value refer to the numerical value ±10%, preferably ±5%. All numerical values herein should be interpreted as being modified by the term "about".

The term "amorphous" used herein means having no melt transition when measured using Differential Scanning calorimetry (DSC).

The term "crystalline" used herein means having a melt transition when measured using Differential Scanning calorimetry (DSC).

Unless specified otherwise, the recitation of numerical end points includes all numbers and fractions subsumed within the respective ranges, as well as the recited end points.

All references cited in the present specification are hereby incorporated by reference in their entirety.

Unless otherwise defined, all terms used in the present invention, including technical and scientific terms, have the meaning as commonly understood by one of the ordinary skilled in the art to which this invention belongs.

The molecular weight (M) mentioned herein is determined through the end group analysis by measuring the hydroxy number according to DIN EN 4629 and the acid number according to DIN EN ISO 2114.

In this context, the glass transition temperature (Tg) or the melting point of a specific polymer is determined using DSC according to DIN 53 765.

The softening point mentioned herein is determined though Ring and Ball method according to DIN ISO 4625.

Hereinafter the moisture-curable polyurethane hot melt adhesive composition will be described in detail.

The moisture-curable polyurethane hot melt adhesive composition according to the present invention comprises, consists essentially of or consists of a moisture-curable polyurethane prepolymer, the prepolymer being a reaction product of at least one amorphous polyester polyol containing an aromatic group and at least one polyisocyanate, preferably at least one polyisocyanate containing an aromatic group, wherein the aromatic group is comprised in the polyurethane prepolymer in a content of no less than 23 wt. %, preferably no less than 25 wt. %, more preferably no less than 30 wt. %.

The hot melt adhesive composition of the present invention can form good bonding strength and can exhibit a lap shear strength of more than 2.5 Mpa, preferably more than 3 Mpa, more preferably more than 5 Mpa when tested according to ASTM D1002 using ABS/ABS substrates and 100% pure oleic acid. Meanwhile, the hot melt adhesive composition of the present invention can exhibit a bonding strength retention rate of more than 40%, preferably more than 50%, more preferably more than 80%, after tested according to ASTM D1002 using ABS/ABS substrates and 100% pure oleic acid.

The moisture-curable polyurethane prepolymer of the present invention may only derived from two main reactants (or two main raw materials), that is, an amorphous polyester polyol containing an aromatic group and a polyisocyanate. As for the main reactant amorphous polyester polyol containing an aromatic group, it is required to have an aromatic group, especially in the backbone, for example, substituted or unsubstituted benzene groups. As for the main reactant polyisocyanate, it is not necessary to have an aromatic group, however, preferably, the polyisocyanate used in the present invention comprises an aromatic group, such as benzene-derived groups.

In addition to the above two main reactants, a crystalline polyester polyol can be optionally comprised in a very small content as a co-reactant for forming the polyurethane prepolymer of the present invention. It can also be interchangeably expressed as that a crystalline polyester polyol can be optionally comprised in a very small content in the polyurethane prepolymer. For example, the crystalline polyester polyol can be optionally comprised in the polyurethane prepolymer in a content of less than 10 wt %, preferably less than 5 wt. %, more preferably less than 3 wt. %, based on the weight of the polyurethane prepolymer. Preferably, no crystalline polyester polyol is comprised in the polyurethane prepolymer of the present invention. Using a very small content of the crystalline polyester polyol or even using no crystalline polyester polyol is an important aspect of the present invention.

Further, an amorphous polyester polyol having no aromatic group can be optionally comprised, preferably in a very small content, as a co-reactant for forming the polyurethane prepolymer of the present invention. It can also be interchangeably expressed as that an amorphous polyester polyol having no aromatic group can be optionally comprised, preferably in a very small content, in the polyurethane prepolymer. For example, the amorphous polyester polyol having no aromatic group can be optionally comprised in a content of less than 30 wt %, preferably less than 15 wt. %, more preferably less than 10 wt. %, more preferably less than 5 wt. % based on the weight of the polyurethane prepolymer. Preferably, no polyester polyol having no aromatic group is comprised in the polyurethane prepolymer. If the amorphous polyester polyol having no aromatic group presents, useful ones include those conventionally used for preparation of polyurethane.

Further, a polyether polyol can also be optionally comprised, preferably in a very small content, as a co-reactant for forming the polyurethane prepolymer of the present invention. It can also be interchangeably expressed as that a polyether polyol can be optionally comprised, preferably in a very small content, in the polyurethane prepolymer. For example, the polyether polyol can be optionally comprised in a content of less than 30 wt %, preferably less than 15 wt. %, more preferably less than 10 wt. %, more preferably less than 5 wt. % based on the weight of the polyurethane prepolymer. Preferably, no polyether polyol is comprised in the polyurethane prepolymer. If the polyether polyol presents, suitable polyether polyols include those having an aromatic group and those having no aromatic group, preferably having a molecular weight of from about 100 g/mol to about 8000 g/mol, from about 200 g/mol to about 4000 g/mol, or even from about 200 g/mol to about 1000 g/mol. For example, useful polyether polyols are derived from oxide monomers (e.g., ethylene oxide, propylene oxide, 1,2-butylene oxide, 1,4-butylene oxide, tetrahydrofuran, and combinations thereof) and a polyol initiator (e.g., ethylene glycol, propylene glycol, butanediols, hexanediols, glycerols, trimethylolethane, trimethylolpropane, and pentaerythritol, and combinations thereof) and optionally comprise an aromatic group.

The expression "the aromatic group is comprised in the polyurethane prepolymer in a content of no less than 23 wt. %" can be interpreted as that the aromatic group constitutes no less than 23 wt. % of the reactants for forming the polyurethane prepolymer. The content of aromatic groups is calculated based on the chemical formulae of reactants as well as their amounts. For example, when the aromatic group is benzene-derived group, the content of aromatic groups is calculated based on the benzene ring.

When the polyurethane prepolymer is derived from only two main reactants, that is, an amorphous polyester polyol containing an aromatic group and a polyisocyanate, the content of the aromatic group in the polyurethane prepolymer is calculated based on the amorphous polyester polyol containing an aromatic group and the polyisocyanate. Under such condition, there is no particular limitation on the content of aromatic groups in the amorphous polyester polyol and the content of aromatic group in the polyisocyanate, as long as the content of aromatic groups in the amorphous polyester polyol and the polyisocyanate in total reaches no less than 23 wt. %, preferably no less than 24 wt. %, more preferably no less than 25 wt. %, more preferably no less than 26 wt. %, more preferably no less than 27 wt. %, more preferably no less than 28 wt. %, more preferably no less than 29 wt. %, more preferably no less than 30 wt. %, calculated on basis of the weight of the amorphous polyester polyol and the polyisocyanate.

When the polyurethane prepolymer is derived from two main reactants and other co-reactants such as the above polyester polyol(s) having no aromatic group and/or polyether polyol(s), the content of the aromatic group in the polyurethane prepolymer is calculated based on the two main reactants and the co-reactants. Under such condition, there is no particular limitation on the content of aromatic groups in the amorphous polyester polyol and the content of aromatic group in the polyisocyanate, as long as the content of aromatic groups in the polyurethane prepolymer in total reaches no less than 23 wt %, preferably no less than 24 wt. %, more preferably no less than 25 wt %, more preferably no less than 26 wt. %, more preferably no less than 27 wt. %, more preferably no less than 28 wt. %, more preferably no less than 29 wt %, more preferably no less than 30 wt. %, calculated on basis of the weight of the two main reactants and the co-reactants.

In this context, when the term "amorphous polyester polyol" is mentioned without indicating whether an aromatic group is comprised or not, it should be interpreted as the amorphous polyester polyol containing an aromatic group.

The amorphous polyester polyol containing an aromatic group of the present invention may have a molecular weight of from about 500 g/mol to about 10,000 g/mol, from about 600 g/mol to about 6000 g/mol, or from about 700 g/mol to about 5000 g/mol. When two or more amorphous polyester polyols containing an aromatic group are used in the present invention as a mixture to take part in the reaction, each amorphous polyester polyol may have a molecular weight falling in the above range.

The amorphous polyester polyol containing an aromatic group used in the present invention can be liquid or solid. When solid one is used, it is preferable for it to have a softening point of no greater than 130° C., preferably no greater than 120° C., preferably no greater than 105° C., for example, 60° C., 80° C., 100° C., from the viewpoints of achieving good bonding strength and easy to application.

The amorphous polyester polyols containing an aromatic group useful in the present invention include those carrying at least two OH groups in one molecule, for example three OH groups or four OH groups and having aromatic group(s) in the molecule.

The expression "at least one amorphous polyester polyol as a whole has a Tg of no less than −20° C." used herein should be interpreted as follows. When the polyurethane prepolymer is derived from only two main reactants, that is, an amorphous polyester polyol containing an aromatic group and a polyisocyanate, if only one type of the amorphous polyester polyol is used in the present invention to take part in the reaction, the Tg of the amorphous polyester polyol itself is the Tg of the at least one amorphous polyester polyol as a whole. If two or more types of amorphous polyester polyols are used in the present invention to take part in the reaction, the Tg of the at least one amorphous polyester polyol refers to the calculated Tg according to the following modified Gordon-Taylor equation (I), that is, these amorphous polyester polyols as a whole have a calculated Tg of no less than −20° C., which means that an amorphous polyester polyol having a Tg of less than −20° C. can be used as long as the calculated Tg as a whole is no less than −20° C. In present invention, the calculated Tg of two or more amorphous polyester polyols can be calculated according to the following modified Gordon-Taylor equation (I):

$$Tg=W1\times Tg1+W2\times Tg2+\ldots Wn\times Tgn \quad (I)$$

Wherein:

W1 is weight percentage of the first polyester polyol based on total polyester polyols, Tg1 is the Tg of the first polyester polyol, W2 is weight percentage of the second polyester polyol based on total polyester polyols, Tg2 is the Tg of the second polyester polyol;

Wn is weight percentage of the $n^{th}$ polyester polyol based on total polyester polyols, Tgn is the Tg of the $n^{th}$ polyester polyol.

There is no particular limitation on the upper limit of the Tg of the amorphous polyester polyol as a whole used in the present invention. For example, the Tg upper limit of the amorphous polyester polyol as a whole can be 50° C., or 60° C. or even more.

The expression "the polyols as a whole have a Tg of no less than −20° C., preferably no less than −17° C., more preferably no less than −16° C." should be interpreted as follows. When the polyurethane prepolymer is derived from two main reactants and other co-reactants such as the above polyester polyol(s) having no aromatic group and/or polyether polyol(s), the Tg of the polyols refers to the calculated Tg according to the following modified Gordon-Taylor equation (II), that is, these polyols as a whole have a calculated Tg of no less than −20° C., which means that an polyol having a Tg of less than −20° C. can be used as long as the calculated Tg as a whole is no less than −20° C. In present invention, the calculated Tg of two or more polyols can be calculated according to the following modified Gordon-Taylor equation (II):

$$Tg=W1\times Tg1+W2\times Tg2+\ldots Wn\times Tgn \quad (II)$$

Wherein:

W1 is weight percentage of the first polyol based on total polyols,

Tg1 is the Tg of the first polyol,

W2 is weight percentage of the second polyol based on total polyols,

Tg2 is the Tg of the second polyol;

Wn is weight percentage of the $n^{th}$ polyol based on total polyols,

Tgn is the Tg of the $n^{th}$ polyol.

There is no particular limitation on the upper limit of the Tg of the polyols as a whole used in the present invention. For example, the Tg upper limit of the polyols as a whole can be 50° C., or 60° C. or even more.

Preferably, the hot melt adhesive composition of the present invention exhibits a viscosity of no more than 30,000 mPas at 110° C., preferably a viscosity of no more than 10,000 mPas at 110° C., preferably no more than 7000 mPas at 110° C., more preferably no more than 6000 mPas at 110° C., measured with Brookfield Thermosel viscometer using spindle 27 under 20 rpm.

The amorphous polyester polyol used herein comprises or is a reaction product of one or more polyacids and one or more polyols, wherein at least one of the polyacids and/or at least one of the polyols containing aromatic group(s) such as benzene-derived groups.

The one or more polyacids can be selected from terephthalic acid (TPA), isophthalic acid (IPA), phthalic acid (PA), methyl-hexahydrophthalic acid, methyl-tetrahydrophthalic acid, hexahydrophthalic acid, tetrahydrophthalic acid, maleic acid, succinic acid, glutaric acid, adipic acid (AA), pimelic acid, suberic acid, azelaic acid, sebacic acid, chlorendic acid, 1,2,4-butane-tricarboxylic acid, decanedicarboxylic acid, octadecanedicarboxylic acid, dimeric acid, dimerized fatty acids, trimeric fatty acids, fumaric acid, 1,3-cyclohexanedicarboxylic acid, 1,4-cyclohexanedicarboxylic acid, anhydrides of the above acids, and combinations thereof. Preferably, the one or more polyacids can be selected from terephthalic acid, isophthalic acid, phthalic acid and adipic acid, and anhydrides thereof.

The one or more polyols can be selected from ethylene glycol (EG), propanediols (including 1,2- or 1,3-propanediol), butanediols (including 1,2- or 2,3- or 1,3- or 1,4-butanediol), butenediols (including 1,3- or 2,3- or 1,4-butenediol), butynediol (including 1,4-butynediol), pentanediols (including 1,2- or 1,3- or 1,4- or 1,5-pentanediol), pentenediols, pentynediols, hexanediols (HD) (including 1,2- or 1,3- or 1,4- or 1,5- or 1,6- or 2,3- or 2,4- or 2,5- or 2,6- or 3,4-hexanediol), octanediols (including 1,2- or 1,3- or 1,4- or 1,5- or 1,6- or 1,7- or 1,8-hexanediol), nonanediols, decanediols, neopentyl glycol (NPG), diethylene glycol (DEG), triethylene glycol, tetraethylene glycol, polyethylene glycols, propylene glycol, dipropylene glycol, tripropylene glycol, cyclohexanedimethanol, cyclohexanediol, dimer diols, bisphenol A, bisphenol F, hydrogenated bisphenol A, hydrogenated bisphenol F, glycerol, tetramethylene glycol, polytetramethylene glycol, 3-methyl-1,5-pentanediol, 2-methyl-1,8-octanediol, trimethylolpropane, pentaerythritol, sorbitol, glucose, and combinations thereof. Preferably, the one or more polyols can be selected from hexanediols (including 1,2- or 1,3- or 1,4- or 1,5- or 1,6- or 2,3- or 2,4- or 2,5- or 2,6- or 3,4-hexanediol), ethylene glycol, neopentyl glycol, diethylene glycol.

Polyisocyanates useful in the present invention include those conventionally used to prepare polyurethane, for example, those carrying at least two isocyanate groups (—NCO groups) in one molecule and preferably having at least one aromatic group such as benzene-derived group in one molecule. In the present invention, one or more polyisocyanates can be used to prepare the polyurethane prepolymer.

Useful polyisocyanates in the present invention include aliphatic polyisocyanates, e.g., hexamethylene diisocyanate (HDI), isophorone diisocyanate (IPDI), hydrogenated diphenylmethane diisocyanate, 1,6-diisocyanato-2,4,4-trimethylhexane, 1,4-cyclohexane diisocyanate (CHDI), 1,4-cyclohexane bis(methylene isocyanate) (BDI), 1,3-bis (isocyanatomethyl)cyclohexane (H6 XDI), dicyclohexylmethane diisocyanate (H12 MDI); aromatic polyisocyanates, e.g., diphenylmethane diisocyanate compounds (MDI) including its isomers (e.g., diphenylmethane 4,4'-diisocyanate, diphenylmethane-2,2'-diisocyanate, diphenylmethane-2,4'-diisocyanate, oligomeric methylene isocyanates having the formula:

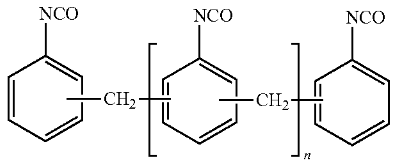

where n is an integer of from 0 to 5, and mixtures thereof), carbodiimide modified MDI, naphthalene diisocyanates including isomers thereof (e.g., 1,5-naphthalene diisocyanate (NDI)), isomers of triphenylmethane triisocyanate (e.g., triphenylmethane-4,4',4"-triisocyanate), toluene diisocyanate compounds (TDI) including isomers thereof, 1,3-xylene diisocyanate (XDI), tetramethylxylene diisocyanate (TMXDI) (e.g., p-1,1,4,4-tetramethylxylene diisocyanate (p-TMXI) and m-1,1,3,3-tetramethylxylylene diisocyanate (m-TMXDI)), and mixtures thereof.

Preferably, the molar ratio of hydroxy groups to isocyanate groups in the composition used to prepare the polyurethane prepolymer is from about 0.2:1 to about 0.9:1. Under the condition that the above molar ratio is satisfied, the weight percentages of the polyol(s) and the polyisocyanate(s) are not particularly limited.

The polyurethane prepolymer of the present invention can be prepared in any suitable manner including by reacting the polyols with the polyisocyanate at an elevated temperature of from greater than 60° C. to about 160° C. The polyol may first be introduced into a reaction vessel, heated to reaction temperatures and dried under vacuum to remove ambient moisture absorbed by the polyols. The polyisocyanate is then added to the reactor. The reaction between the polyols and the polyisocyanate is conducted at an OH:NCO ratio of from about 0.2:1 to about 0.9:1, or even from about 0.3:1 to about 0.7:1. If appropriate, a catalyst that is conventionally used in the polyurethane preparation may be used herein.

In the moisture curable polyurethane hot melt adhesive composition, in addition to the polyurethane prepolymer, a catalyst can be included to facilitate moisture cure. Useful catalysts herein include ether and morpholine functional groups, examples of which include 2,2'-dimorpholinoethylether, di(2,6-dimethyl morpholinoethyl)ether, and 4,4'-(oxydi-2,1-ethanediyl)bis-morpholine. A variety of metal catalysts are suitable including, e.g., catalysts based on tin (e.g. dibutyltin dilaurate and dibutyltin acetate), bismuth, zinc, and potassium. The moisture curable hot melt adhesive composition optionally includes from about 0.01% by weight to about 2% by weight or even from about 0.05% by weight to about 1% by weight catalyst to facilitate moisture cure.

The moisture curable adhesive composition optionally includes a variety of additives including, e.g., thermoplastic polymer, tackifying agent, plasticizer, wax, stabilizer, antioxidant, fillers (talcs, clays, silicas and treated versions thereof, carbon blacks and micas, microparticles including, e.g., microspheres (e.g., glass microspheres, polymer microspheres, and combinations thereof), ultraviolet (UV) scavengers and absorbers, pigments (e.g., reactive or nonreactive oxides), fluorescing agents, odor masks, adhesion promoters (i.e., silane-based adhesion promoters), surfactants, defoamers, and combinations thereof.

Useful thermoplastic polymers include, e.g., ethylene vinyl acetate, ethylene vinyl acetate and vinyl alcohol copolymer, ethylene vinyl butyrate, ethylene acrylic acid, ethylene methacrylic acid, ethylene acrylamide copolymer, ethylene methacrylamide, acrylate copolymers (e.g., methyl acrylate, ethyl acrylate, methyl methacrylate, 2-ethylhexyl acrylate, 2-ethylhexyl methacrylate, methoxyethyl methacrylate, methoxyethyl acrylate, ethylene ethyl acrylate, ethylene n-butyl acrylate, and ethylene hydroxyethyl acrylate), ethylene n-butyl acrylate carbon-monoxide terpolymer, polyolefins (e.g., polypropylene and polyethylene), thermoplastic polyurethane, butylene/poly(alkylene ether) phthalate, thermoplastic polyester, and combinations thereof. The moisture curable adhesive composition optionally includes from about 0% by weight to no greater than 4% by weight or even from about 0.1% by weight to no greater than about 4% by weight thermoplastic polymer.

Useful tackifying agents include, e.g., aromatic, aliphatic, and cycloaliphatic hydrocarbon resins, mixed aromatic and aliphatic modified resins, aromatic modified hydrocarbon resins, and hydrogenated versions thereof; terpenes, modified terpenes, and hydrogenated versions thereof; rosin esters (e.g., glycerol rosin ester, pentaerythritol rosin ester, and hydrogenated versions thereof); and combinations thereof. Useful aromatic resins include, e.g., aromatic modified hydrocarbon resins, alpha-methyl styrene resin, styrene, polystyrene, coumorone, indene, and vinyl toluene, and styrenated terpene resin, polyphenols, polyterpenes, and combinations thereof. Useful aliphatic and cycloaliphatic petroleum hydrocarbon resins include, e.g., branched and unbranched C5 to C9 resins and the hydrogenated derivatives thereof. Useful polyterpene resins include copolymers and terpolymers of natural terpenes (e.g. styrene-terpene, alpha-methyl styrene-terpene, and vinyl toluene-terpene).

Useful waxes include, e.g., hydroxy modified waxes, carbon monoxide modified waxes, hydroxy stearamide waxes, fatty amide waxes, hydrocarbon waxes including, e.g., high density low molecular weight polyethylene waxes, paraffin waxes and microcrystalline waxes, and combinations thereof. The moisture curable adhesive composition optionally includes from about 0% by weight to about 3% by weight or even from about 0% by weight to about 1% by weight wax.

One useful class of stabilizers includes carbodiimide stabilizers.

Examples of useful antioxidants include hindered phenolic antioxidants, phosphite antioxidants, thioether antioxidants. Commercially available examples include RGANOX 565, 1010 and 1076 available from Ciba-Geigy (Hawthorne, N.Y.). The moisture curable polyurethane hot melt adhesive composition optionally includes no greater than about 2% by weight antioxidant.

The fillers can be in a variety of forms including, e.g., particles (spherical particles, beads, and elongated particles), fibers, and combinations thereof.

Examples of useful pigments include inorganic, organic, reactive, and nonreactive pigments, and combinations thereof.

The moisture curable adhesive composition can also optionally include organofunctional silane adhesion promoters. Preferred organofunctional silane adhesion promoters include silyl groups such as alkoxysilyls, aryloxysilyls, and combinations thereof. Examples of useful alkoxysilyl groups include methoxysilyl, ethoxysilyl, propoxysilyl, butoxysilyl, and acyloxysilyl reactive groups including, e.g., silyl ester of various acids including, e.g., acetic acid, 2-ethylhexanoic acid, palmitic acid, stearic acid, and oleic acid.

Suitable silane-based adhesion promoters include, e.g., epoxy glycidoxy propyl trimethoxy silane, octyltriethoxysilane, methyltrimethoxysilane, beta-(3,4-epoxy cyclohexyl) ethyl trimethoxy silane, methacryloxypropyl trimethoxy silane, alkyloxyiminosilyls, vinyl trimethoxy silane, vinyl triethoxy silane, vinyl methyl dimethoxy silane, amino propyl trimethoxy silane, amino propyl triethoxy silane, N-phenyl amino propyl trimethoxy silane, bis-(trimethoxy silyl propyl)amine, N-beta-(aminoethyl)-amino propyl trimethoxy silane, N-beta-(aminoethyl)-amino propyl trimethoxy silane, N-beta-(aminoethyl-amino propylmethyl dimethoxy silane, ureido propyl trimethoxy silane, tris[3-(trimethoxysilyl) propyl] isocyanurate, 4-amino-3,3-dimethylbutyldimethoxymethylsilane, and ethoxy and methoxy/ethoxy versions thereof, mercaptopropyl trimethoxysilane, and mixtures thereof.

The additives in total constitute no more than 10 wt %, preferably no more than 5 wt. % of the adhesive composition of the present invention.

In another aspect of the present invention, a method for bonding two substrates is provided, including applying the moisture curable polyurethane hot melt adhesive composition of the present invention to at least one of the substrates.

The moisture curable adhesive composition can be applied to a substrate using any suitable application method including, e.g., automatic fine line dispensing, jet dispensing, slot die coating, roll coating, gravure coating, transfer coating, pattern coating, screen printing, spray coating, filament coating, by extrusion, air knife, trailing blade, brushing, dipping, doctor blade, offset gravure coating, rotogravure coating, and combinations thereof. The moisture curable adhesive composition can be applied as a continuous or discontinuous coating, in a single or multiple layers, and combinations thereof. The moisture curable adhesive composition can be applied at any suitable temperature including, e.g., from about 60° C. to about 175° C., or from about 90° C. to about 130° C.

Optionally, the surface of the substrate on which the moisture curable adhesive composition is applied is treated to enhance adhesion using any suitable method for enhancing adhesion to the substrate surface including, e.g., corona treatments, chemical treatments (e.g., chemical etching), flame treatments, abrasion, and combinations thereof.

In another aspect of the present invention, an article bonded with the cured polyurethane hot melt adhesive composition of the present invention is provided.

The article can include a substrate having a variety of properties including rigidity (e.g., rigid substrates (i.e., the substrate cannot be bent by an individual using two hands or will break if an attempt is made to bend the substrate with two hands), flexibility (e.g., flexible substrates (i.e., the substrate can be bent using no greater than the force of two hands), porosity, conductivity, lack of conductivity, and combinations thereof.

The substrates of the article can be in a variety of forms including, e.g., fibers, threads, yarns, wovens, nonwovens, films (e.g., polymer film, metallized polymer film, continuous films, discontinuous films, and combinations thereof), foils (e.g., metal foil), sheets (e.g., metal sheet, polymer sheet, continuous sheets, discontinuous sheets, and combinations thereof), and combinations thereof.

Useful substrate compositions include, e.g., polymer (e.g., polycarbonate, ABS resin (Acrylonitrile-Butadiene-Styrene resin), polyolefin (e.g., polypropylene, polyethylene, low density polyethylene, linear low density polyethylene, high density polyethylene, polypropylene, and oriented polypropylene, copolymers of polyolefins and other comonomers), polyether terephthalate, ethylene-vinyl acetate, ethylene-methacrylic acid ionomers, ethylene-vinyl-alcohols, polyesters, e.g. polyethylene terephthalate, polycarbonates, polyamides, e.g. Nylon-6 and Nylon-6,6, polyvinyl chloride, polyvinylidene chloride, cellulosics, polystyrene, and epoxy), polymer composites (e.g., composites of a polymer and metal, cellulose, glass, polymer, and combinations thereof), metal (aluminum, copper, zinc, lead, gold, silver, platinum, and magnesium, and metal alloys such as steel (e.g., stainless steel), tin, brass, and magnesium and aluminum alloys), carbon-fiber composite, other fiber-based composite, graphene, fillers, glass (e.g., alkali-aluminosilicate toughened glass and borosilicate glass), quartz, boron nitride, gallium nitride, sapphire, silicon, carbide, ceramic, and combinations thereof.

The substrate can be of a single material and a single layer or can include multiple layers of the same or different material. The layers can be continuous or discontinuous.

A variety of articles can include the adhesive composition including, e.g., clothing (e.g., jackets, coats, shirts, sweaters, pants, socks, belts, watches (e.g., watchbands), footwear (e.g., shoes and boots, e.g., ski boots), hand wear (e.g., gloves), head wear (e.g., hats, head bands, and ear muffs), neck wear (e.g., scarves), and combinations thereof. In some embodiments, the article is a piece of clothing that is intended to be worn by an individual and that includes a first substrate, the moisture cured polyurethane hot melt adhesive composition in contact with the first substrate, and optionally a second substrate bonded to the first substrate through the adhesive composition.

The adhesive composition is useful in a variety of electronic devices including, e.g., wearable electronic devices (e.g., wrist watches and eyeglasses), handheld electronic devices (e.g., phones (e.g., cellular telephones and cellular smartphones), cameras, tablets, electronic readers, monitors (e.g., monitors used in hospitals, and by healthcare workers, athletes and individuals), watches, calculators, mice, touch pads, and joy sticks), computers (e.g., desk top and lap top computers), computer monitors, televisions, media players, appliances (e.g., refrigerators, washing machines, dryers, ovens, and microwaves), light bulbs (e.g., incandescent, light emitting diode, and fluorescent), and articles that include a visible transparent or transparent component, glass housing structures, protective transparent coverings for a display or other optical component.

EXAMPLES

The invention will now be described by way of the following examples. The following examples are intended to assist one skilled in the art to better understand and practice the present invention. The scope of the invention is not limited by the examples but is defined in the appended claims. All parts and percentages are based on weight unless otherwise stated.

Polyurethane Hot Melt Adhesive Composition Preparation

In accordance to the components and amounts (in g) of Table 1, the polyol(s) was introduced into a reaction vessel together with 0.1 g of Evernox 10 as antioxidant and 0.05 g of p-Toluenesulfonyl isocyanate (PTSI) as moisture scavenge, heated to reaction temperature of 140° C. and dried under vacuum to remove ambient moisture absorbed by the raw materials. Then the temperature was lowered to 120° C., and the polyisocyanate was added to the vessel. After reaction for 60 min under stirring, a catalyst, 2,2'-dimorpholinoethylether, was added thereto, keep stirring for further 10 min, then stop stirring and release vacuum; and the composition obtained was stored in a sealed tube.

Viscosity Measurement:

Viscosity was measured with Brookfield Thermosel viscometer using spindle 27 under 20 rpm, 110° C.

Test Samples Preparation

Each test sample was constructed from two cleaned ABS plastic sheets (25.4 mm in width, 101.6 mm in length, 3 mm in thickness), two stainless steel wires each with diameter of 0.127 mm and the polyurethane adhesive. Firstly, the ABS sheets were wiped and cleaned with isopropanol. Then, the polyurethane adhesive molten at 110° C. was applied at one end of one ABS sheet such that the amount of the adhesive forms a bonding area in width of 2±0.2 mm and length of 25.4 mm, and two stainless wires were put on each side of the applied adhesive. The other ABS sheet was put on the first ABS sheet with an overlap area of 12.7 mm×25.4 mm such that the applied adhesive was kept at the center of the overlap area. 2 kg force were applied on the overlap area until the adhesive cured under condition of 23° C. and 50% relative humidity.

Please refer to FIG. 1 for the finished test sample.

Lap Shear Strength Test

The lap shear strength was tested according to ASTM test method D1002 entitled, "Standard Test Method for Apparent Sheer Strength of Single Lamp Joint Adhesively Bonded Metal Specimens by Tension Loading (Metal To Metal)," with the exception that the test samples were prepared according to the above method. The pulling speed was 10 mm/min. The maximum load was recorded, and the lap shear strength was calculated through dividing the maximum load by the bonding area.

Oleic Acid Resistance Test

The test sample was prepared according to the above method and cured for 24 h, then 100% pure oleic acid was applied using a transfer pipet along the edges of the overlap bond such that capillary action drew the oleic acid to the center of the sample. The oleic acid should completely fill any empty space around the adhesive. Then the sample was aged under a condition of 65° C. and 90% relative humidity for 72 h. The aged sample was taken out and put under room temperature, after 2 h, lap shear strength was tested according to the above method using the aged sample.

Retention Rate of the Bond Strength

Retention Rate was Calculated According to the Following Equation:

$$\text{Retention rate} = (\text{lap shear strength after aging}/\text{lap shear strength before aging}) * 100\%.$$

In many application fields, a retention rate of greater than 40% is acceptable, preferably greater than 50%, more preferably greater than 80%.

Raw Materials:

- Amorphous polyester diol 1: a polyester diol prepared from TPA, IPA, AA, EG and NPG.
- Amorphous polyester diol 2: a polyester diol prepared from PA, AA, EG and NPG.
- Amorphous polyester diol 3: a polyester diol prepared from TPA, AA, EG and NPG.

TABLE 1

| | Com. Ex. 1 | Com. Ex. 2 | Com. Ex. 3 | Ex. 1 | Ex. 2 | Ex. 3 | Ex. 4 | Ex. 5 | Ex. 6 | Ex.7 |
|---|---|---|---|---|---|---|---|---|---|---|
| hexanediol phthalate polyester diol, liquid, (Amorphous, M = 2000, Tg = −15° C., benzene content: about 31%) | 80 | 55 | 51 | 80 | 51 | 50 | 50 | 65 | 25 | 79 |
| Amorphous polyester diol 1, solid, Tsoftening = 79 (M = 3000, Tg = 30° C., benzene content: about 27.9%) | | | | | 30 | | | 5 | | |
| Amorphous polyester diol 2, solid, Tsoftening = 55 (M = 2000, Tg = 10° C., benzene content: about 27.8%) | | | | | | 30 | | 10 | 30 | |
| Amorphous polyester diol 3, liquid (M = 3500, Tg = −30° C., benzene content: about 11%) | | | 30 | | | | | | 26 | |
| Diethylene glycol phthalate polyester diol, liquid (Amorphous, M = 2000, Tg = −1° C., benzene content: about 35%) | | | | | | | 30 | | | |
| hexanediol adipic acid polyester diol (crystalline, M = 3500, benzene content: 0%) | | 25 | | | | | | | | |

TABLE 1-continued

| | Com. Ex. 1 | Com. Ex. 2 | Com. Ex. 3 | Ex. 1 | Ex. 2 | Ex. 3 | Ex. 4 | Ex. 5 | Ex. 6 | Ex.7 |
|---|---|---|---|---|---|---|---|---|---|---|
| MDI (benzene content: 60%) | | 18.3 | 19 | 20.1 | 19 | 20 | 20 | 20 | 19 | 14.8 |
| HDI dimer (benzene content: 0%) | 30 | | | | | | | | | 6 |
| Calculated benzene content in total [%] | 22.7 | 28.6 | 30.5 | 37.0 | 35.6 | 36.0 | 37.5 | 36.4 | 30.3 | 33.6 |
| Calculated Tg of polyols as a whole [° C.] | −15 | N.A. | −22.6 | −15 | 1.65 | −5.63 | −9.75 | −8.9 | −10.5 | −15 |
| Viscosity at 110° C. [mPas] | 6975 | 4000 | 4100 | 3362 | 9475 | 4963 | 3250 | 4450 | 5975 | 4975 |
| Lap shear strength, ABS/ABS, cured after 24 h [Mpa] | 10 | 10.5 | 6.47 | 9.58 | 9.33 | 14.11 | 10.03 | 9.98 | 12 | 12 |
| Lap shear strength, ABS/ABS, Oleic acid aging (65° C./90% RH) 72 h, [Mpa] | 2.3 | 2.4 | 2.27 | 6.52 | 16 | 15.13 | 11.69 | 12.7 | 9.84 | 13 |
| Strength retention rate [%] | 23% | 23% | 35% | 68% | 171% | 107% | 117% | 127% | 82% | 108% |

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A moisture-curable polyurethane hot melt adhesive composition comprising:

a polyurethane prepolymer, wherein the polyurethane prepolymer is a reaction product of (i) at least two amorphous polyester polyols comprising an aromatic group and (ii) at least one polyisocyanate comprising an aromatic group, wherein the polyurethane prepolymer comprises an aromatic group content greater than 30 wt. %, based on the total weight of the at least two amorphous polyester polyols and the at least one polyisocyanate, and wherein the at least two amorphous polyester polyols as a whole have a glass transition temperature greater than −16° C. with a first amorphous polyester polyol having a glass transition temperature of from about 30° C. to about 60° C. and a second amorphous polyester polyol having a glass transition temperature of less than 10° C.

2. The composition of claim 1, wherein the at least two amorphous polyester polyols have a softening point less than 130° C.

3. The composition of claim 1, wherein the at least two amorphous polyester polyols have a molecular weight of from about 500 g/mol to about 10,000 g/mol.

4. The composition of claim 1, wherein the polyurethane prepolymer further comprises a polyether polyol.

5. The composition of claim 4, wherein the polyether polyol is present in an amount of less than 30 wt. %, based on the total weight of the polyurethane prepolymer.

6. The composition of claim 1, wherein the polyurethane prepolymer further comprises an amorphous polyester polyol having no aromatic group.

7. The composition of claim 6, wherein the amorphous polyester polyol having no aromatic group is present in an amount of less than 30 wt. %, based on the total weight of the polyurethane prepolymer.

8. The composition of claim 1, wherein the composition, when cured, exhibits a lap shear strength greater than 3 Mpa, when tested according to ASTM D1002 using ABS/ABS substrates and treated with 100% pure oleic acid.

9. The composition of claim 1, wherein the composition has a viscosity of less than 30,000 mPas at 110° C.

10. The composition of claim 1, wherein the at least two amorphous polyester polyols comprise a reaction product of (i) at least one polyacid and (ii) at least one polyol, wherein the at least one polyacid and/or the at least one polyol comprises an aromatic group.

11. The composition of claim 1, further comprising a catalyst.

12. The composition of claim 1, wherein the polyurethane prepolymer further comprises a crystalline polyester polyol present in an amount of less than 10 wt. %, based on the total weight of the polyurethane prepolymer.

13. An article comprising:

a first substrate;

a cured adhesive comprising a cured product derived from the moisture-curable polyurethane hot melt adhesive composition of claim 1; and a second substrate bonded to the first substrate using the cured adhesive.

14. The article of claim 13, wherein the article is selected from the group consisting of a wearable electronic device, a handheld electronic device, eye glasses, a phone, a tablet, a sound player, a remote control device, a mouse, a watch band, a pump for dispensing medicine, a headband, and any combination thereof.

15. The composition of claim 1, further comprising at least one additive selected from the group consisting of selected from a thermoplastic polymer, a tackifying agent, a plasticizer, a wax, a stabilizer, an antioxidant, talc, clay, silica and treated versions thereof, carbon black, mica, glass microspheres, polymer microspheres, an ultraviolet scavenger, an ultraviolet absorber, a pigment, a fluorescing agent, an odor mask, an adhesion promoter, a surfactant, a defoamer, and any combination thereof.

16. The composition of claim 1, wherein the molar ratio of hydroxy groups to isocyanate groups in the polyurethane prepolymer is from about 0.2:1 to about 0.9:1.

17. The composition of claim 10, wherein the at least one polyacid is selected from the group consisting of terephthalic acid, isophthalic acid, phthalic acid, methyl-hexahydrophthalic acid, methyl-tetrahydrophthalic acid, hexahydrophthalic acid, tetrahydrophthalic acid, maleic acid, succinic acid, glutaric acid, adipic acid, pimelic acid, suberic acid, azelaic acid, sebacic acid, chlorendic acid, 1,2,4-butane-tricarboxylic acid, decanedicarboxylic acid, octadecanedicarboxylic acid, dimeric acid, dimerized fatty acids, trimeric fatty acids, fumaric acid, 1,3-cyclohexanedicarboxylic acid, 1,4-cyclohexanedicarboxylic acid, anhydrides of the acids, and any combination thereof.

18. The composition of claim 10, wherein the at least one polyol is selected from the group consisting of ethylene glycol, propanediols, butanediols, butenediols, butynediol, pentanediols, pentenediols, pentynediols, hexanediols, octanediols, nonanediols, decanediols, neopentyl glycol, diethylene glycol, triethylene glycol, tetraethylene glycol, polyethylene glycols, propylene glycol, dipropylene glycol, tripropylene glycol, cyclohexanedimethanol, cyclohexanediol, dimer diols, bisphenol A, bisphenol F, hydrogenated bisphenol A, hydrogenated bisphenol F, glycerol, tetramethylene glycol, polytetramethylene glycol, 3-methyl-1,5-pentanediol, 2-methyl-1,8-octanediol, trimethylolpropane, pentaerythritol, sorbitol, glucose, and any combination thereof.

19. A moisture-curable polyurethane hot melt adhesive composition comprising:

a polyurethane prepolymer, wherein the polyurethane prepolymer is a reaction product of (i) amorphous hexanediol phthalate polyester diol, (ii) at least one amorphous polyester polyol comprising an aromatic group, and (iii) methylene diphenyl diisocyanate, wherein the polyurethane prepolymer comprises an aromatic group content greater than 30 wt. %, based on the total weight of the amorphous hexanediol phthalate polyester diol, the at least one amorphous polyester polyol comprising the aromatic group, and the methylene diphenyl diisocyanate, wherein the at least one amorphous polyester polyol has a glass transition temperature of from about 30° C. to about 60° C., and wherein the amorphous hexanediol phthalate polyester diol and the at least one amorphous polyester polyol as a whole have a glass transition temperature greater than −16° C.

20. A method of bonding two substrates, the method comprising:

providing a first substrate having a bonding surface and a second substrate having a bonding surface;

disposing the moisture-curable polyurethane hot melt adhesive composition of claim 1 in molten form on the first substrate bonding surface;

disposing the second substrate bonding surface on the moisture-curable polyurethane hot melt adhesive composition in molten form; and cooling the disposed moisture-curable polyurethane hot melt adhesive composition to form a bond between the first substrate and the second substrate.

* * * * *